US005311450A

United States Patent [19]

Ojima

[11] Patent Number: 5,311,450

[45] Date of Patent: May 10, 1994

[54] SYSTEM AND METHOD OF DETECTING AUTHORIZED DISMANTLEMENT OF TRANSACTION MACHINES

[75] Inventor: Touru Ojima, Mitsukaido, Japan

[73] Assignee: Hitachi Maxell, Ltd., Osaka, Japan

[21] Appl. No.: 750,034

[22] Filed: Aug. 23, 1991

[30] Foreign Application Priority Data

Aug. 24, 1990 [JP] Japan .................................. 2-221240

[51] Int. Cl.$^5$ ........................ G08B 29/04; G06K 9/00; G06K 5/00

[52] U.S. Cl. .................................... 364/550; 364/408; 340/541; 902/4; 902/5

[58] Field of Search ........... 364/550, 404, 408, 464.02; 340/541, 545, 571; 902/1-7, 9, 10; 235/382

[56] References Cited

U.S. PATENT DOCUMENTS 4,149,158 4/1979 Iwaoka et al. ........................ 340/568
4,494,114 1/1985 Kaish .............................. 340/825.31
4,808,802 2/1989 Kano .................................. 235/380
4,827,395 5/1989 Anders et al. ...................... 364/138
4,866,661 9/1989 de Prins ............................ 235/382
4,868,757 9/1989 Gil .................................. 364/464.03
4,897,868 1/1990 Engelke et al. ..................... 379/96
4,961,142 10/1990 Elliott et al. ....................... 364/408
4,985,695 1/1991 Wilkinson et al. .................. 340/571

FOREIGN PATENT DOCUMENTS 2207789A 8/1988 United Kingdom .......... G07F 7/00

*Primary Examiner*—Jack B. Harvey
*Assistant Examiner*—Jae H. Choi

[57] ABSTRACT

A firm banking terminal having a data inputting unit, a dismantlement monitor for outputting a detection signal when the terminal body is dismantled, a processor for stopping operation of the terminal when it receives the detection signal, and a memory for storing authorization data allowing dismantlement of the terminal without interrupting normal operations when the data received through the data inputting unit coincides with the authorization data.

4 Claims, 3 Drawing Sheets

SYSTEM AND METHOD OF DETECTING AUTHORIZED DISMANTLEMENT OF TRANSACTION MACHINES

BACKGROUND OF THE INVENTION

The present invention relates to firm banking terminals and more particularly to improvements to a security system for preventing illegal dismantlement of or damage to the body of a firm banking terminal.

At present firm banking terminals transmit and receive data such as a sum of money, a destination bank code, and an account number between enterprises or homes and a bank host computer through a public line network.

However, the terminal body of a firm banking terminal may be illegally dismantled, so that important data such as that mentioned above is exposed and an illegal operation performed. Therefore, a security system which prevents such illegal action is required.

In a conventional proposed researched security system, internal fuses for a ROM, in which programs and other data are stored, are fused away such that the terminal does not operate when the firm banking terminal is dismantled.

In the conventional security system of this type, the banking terminal becomes inoperable when a maintenance man dismantles the terminal for ordinary maintenance or when malfunctions occur. Therefore, a process for preventing the terminal from being made inoperable for maintenance and inspection is required.

SUMMARY OF THE INVENTION

It is an object of the present invention to provide a thigh security firm banking terminal which prevents internal data in the terminal from being exposed when dismantled, prevents the terminal from being made inoperable for ordinary maintenance and inspection, and is easy to maintain.

In order to achieve the above object, the present invention provides a firm banking terminal including a dismantlement detection means for outputting a detection signal when the terminal body is dismantled, a processor for stopping terminal operation upon detection of the detection signal, and memory means which stores authorization data permitting dismantlement. When a check indicates coincidence between data received from a keyboard and data on the authorized person, the processor invalidates the direction signal output by the dismantlement detection means allowing access to the terminal.

When an unauthorized person dismantles the terminal body, the dismantlement detection means sends a detection signal to the MPU microprocessor 11 to stop its operation to thereby prevent the illegal action. When an authorized person such as a maintenance man dismantles the terminal, the data on the authorized person stored in memory means in the firm banking terminal coincide with the data received through the keyboard, so that the processor invalidates the detection signal output by the dismantlement detection means. Therefore, the terminal may be serviced without interrupting normal operation of the system.

The firm banking terminal used herein includes a display, a keyboard, a communication control unit, a memory and a MPU (microprocessor) which controls those elements such that individuals or enterprises store data on bank deposits/savings, and pay and receive money from their bank accounts through telephone lines with a host computer which controls input/output of the data. The memory means includes not only the above-mentioned memories, but also externally connected memories such as IC cards, memory cards, and magnetic discs.

DETAILED DESCRIPTION OF THE PREFERRED EMBODIMENT

One embodiment of the present invention will now be described in detail hereinafter with reference to the drawings.

Figure 1:
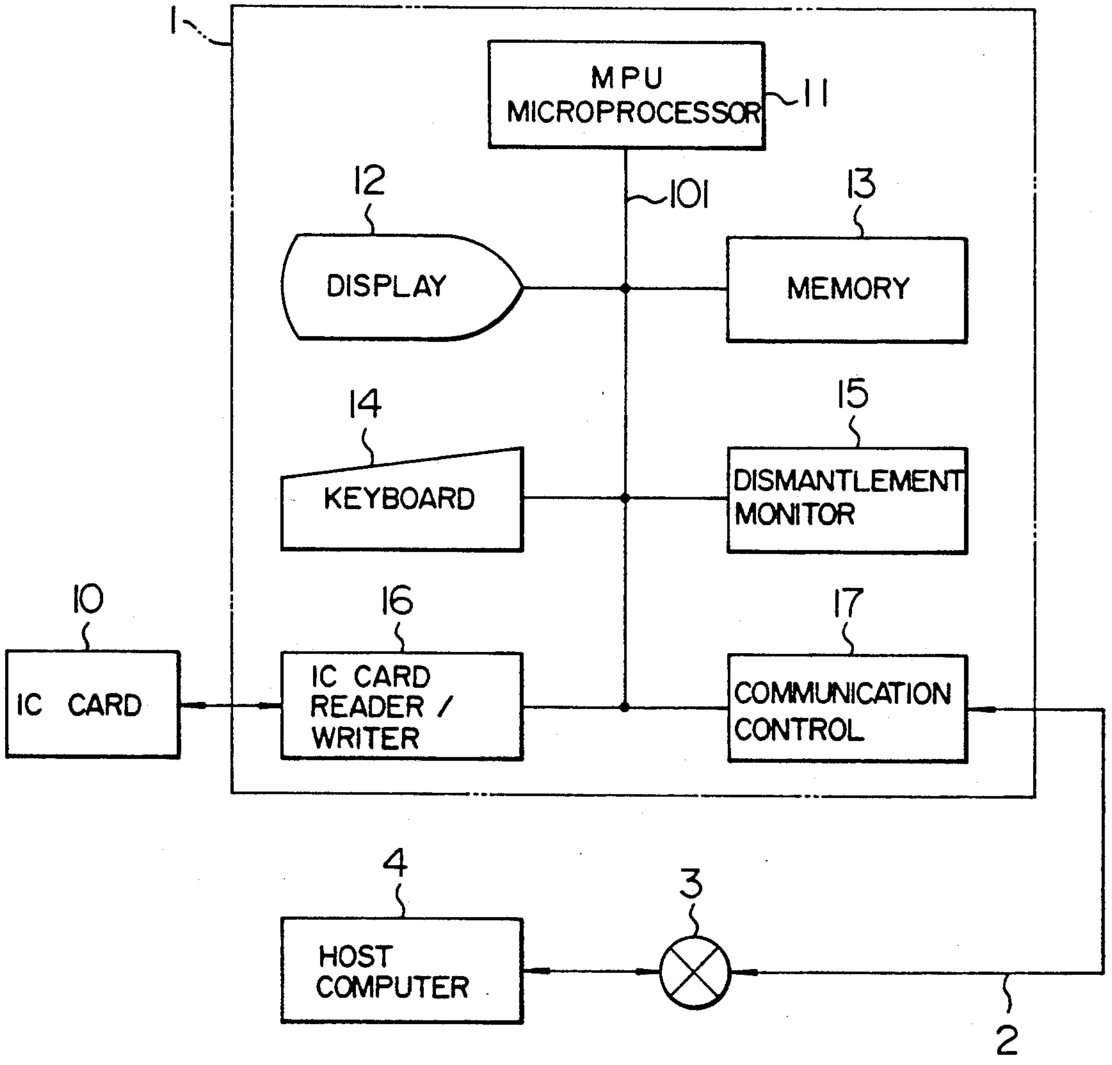
FIG. 1 is a block diagram of one embodiment of a farm banking terminal according to the present invention.
Figure 2:
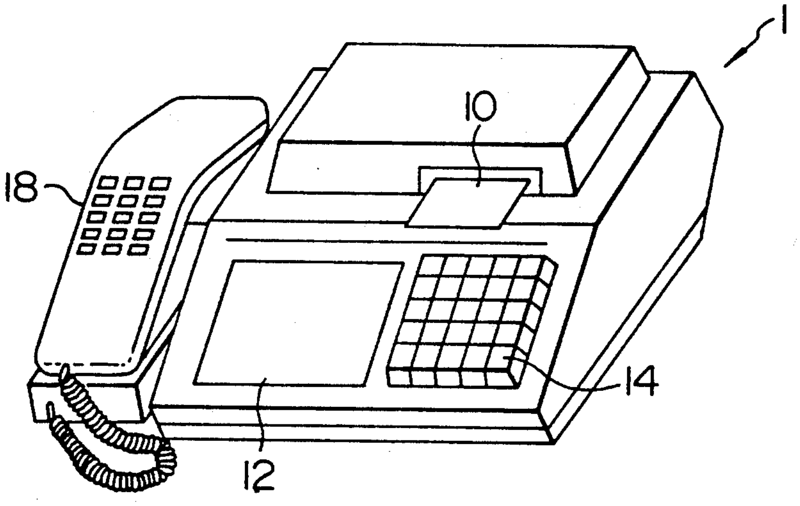
FIG. 2 shows the exterior structure of the terminal.
Figure 3:
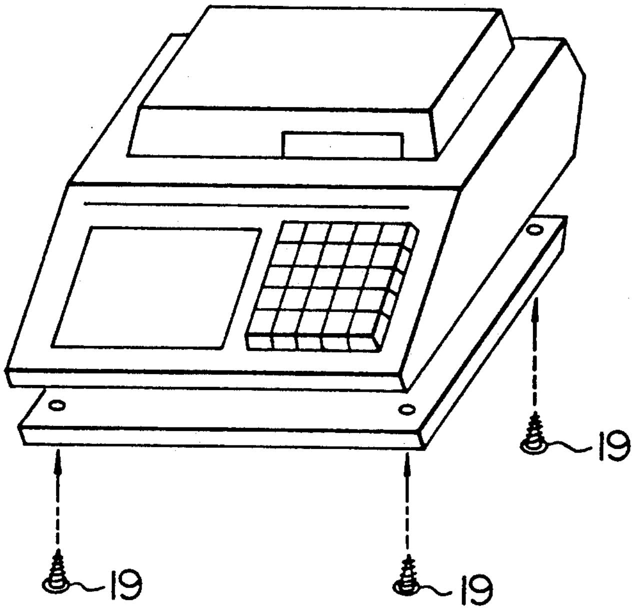
FIG. 3 shows a partially dismantled terminal.
Figure 4:
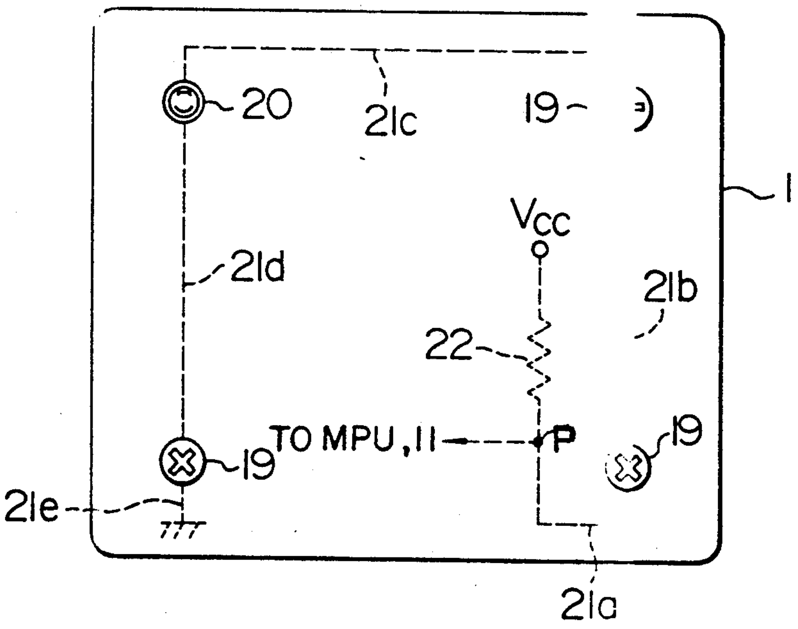
FIG. 4 shows one example of a method for detecting dismantlement.

FIG. 1 is a block diagram indicative of the structure of a firm banking terminal according to one embodiment of the present invention. FIG. 2 shows the exterior structure of this embodiment of the terminal. FIGS. 3 and 4 each illustrate the dismantlement of the terminal body.

As shown in FIG. 1, a firm banking terminal 1 is connected through a public line network 3 and a communication line 2 to a host computer 4. It includes a communication control unit 17 such as a modem which allows the terminal to communicate with network 3, a display 12 which displays operation information and figures, a keyboard 14 for inputting characters, signs or other information into the terminal, an IC card reader/-writer 16 which reads/writes data upon inserting IC card 10 thereinto, a memory 13 including ROM, and RAM, a dismantlement monitor 15 which monitors the terminal, and a microprocessor (MPU) 11 which controls those elements. Each of the component parts are connected through a system bus 101, as shown. The IC card 10 stores identification data for authorizing dismantlement of the terminal without affecting operation of the system. For example, the IC card 10 stores data on identification such as the card issuing company or a password indicative of the card owner, the address and name of the owner, the effective interval of the card, error counts, and business identification data.

Terminal 1 receives services through communication with host computer 4, for example, provided in a bank through public line network 3. In this case, the communicated data is temporarily stored in memory 13.

When an unauthorized person illegally dismantles terminal 1, dismantlement detector 15 detects the dismantlement to deliver a detection signal to MPU 11. As shown in FIG. 4, the dismantlement detector 15 includes leads **21*a*, 21*b*, 21*c*, 21*d* and 21*e*. The leads are electrically connected and conductive when fastened by four screws 19 with lead 21**(*e*) being grounded and lead **21*a* being connected through a resistor 22 to a DC power supply Vcc. Therefore, when all the screw holes 20 are filled with the corresponding screws, the voltage level at P is low while if any one of screws 19 is removed, the conductive state of the leads is interrupted, so that the voltage level at P becomes high. MPU 11 stops its operation when the voltage level at P becomes high thereby rendering the terminal 1** inoperable.

When an authorized person, such as a maintenance man, dismantles the terminal, he inserts the IC card 10 into IC card reader/writer 16 of terminal 1 and inputs authorization data through keyboard 14. At this time, MPU 11 reads the input data stored on the IC card through IC card reader/writer 16 to determine whether the input data coincides with authorization data stored in the internal memory and delivers to MPU 11 a response signal indicative of coincidence or non-coincidence. When the result indicates coincidence, MPU 11 interrupts a dismantlement detection signal which dismantlement monitor 15 delivers when the terminal 1 is dismantled.

If an unauthorized dismantlement occurs, the dismantlement monitor renders the MPU 11 inoperable. In order to make MPU 11 inoperable, for example, MPU 11 may be put in a sleeping state by terminating power to the MPU 11 or erasing the operating program. Especially, when the operating program stored in the memory is erased, illegal use of the terminal is prevented and security is improved even if the terminal is dismantled.

The above embodiment determines whether the data on the authorized person stored in the IC card coincides with the data received from the keyboard 14, and delivers a response signal indicative of coincidence or non-coincidence to the MPU in the terminal. In another embodiment, the data on the authorized person stored in the IC card may be delivered to the memory in the terminal to determine coincidence in the MPU in the terminal. Alternatively, arrangement may be such that the data on the authorized person is stored in an external memory such as a memory card or a magnetic disc cartridge in place of the IC card, such that the data on the authorized person is delivered from the external memory to the memory in the firm banking terminal and that coincidence or non-incidence is determined by the MPU in the terminal. Preferably, the IC card is used to determine coincidence or non-coincidence in the MPU in the IC card in order to maintain the secrecy of the authorization data. Checking data on the authorized person includes scramble checking.

While the terminal dismantlement monitor using the screws is shown in FIGS. 3 and 4, other measures may be used to detect the dismantlement of the terminal.

When an unauthorized person dismantles the terminal body of this embodiment, the processor stops its operation to prevent an illegal act. In contrast, when an authorized person dismantles the terminal, the data on the authorized person stored in the IC card coincides with the data received through the keyboard and IC card to cause the processor to invalidate the detection signal output by the dismantlement detector, so that the terminal is protected from being made inoperable and hence from being illegally dismantled. Thus, manipulation of data or the like is avoided.

I claim:

1. A security system for detecting and preventing the unauthorized dismantlement of a transaction terminal comprising, in combination:

processor means (11) for controlling operation of the terminal (1);

data inputting means (14) for inputting authorization data to said processor means for identifying a person authorized to dismantle the terminal (1);

dismantlement detection means (15) for outputting a detection signal to said processor means (11) for making said terminal (1) inoperable when the terminal (1) is dismantled; and memory means (13) for storing data on persons authorized to dismantle the terminal, wherein when said processor means (11) determines that the data received through said data inputting means (14) coincides with the data stored in said memory means (13) on the authorized person, said processor (11) interrupts the detection signal allowing dismantlement of the terminal (1) without interrupting normal operations.

2. A security system for a transaction terminal (1) according to claim 1, wherein said dismantlement detection means (15) includes a screw disposed within the terminal such that the dismantlement detection means (15) generates the detection signal when the screw is removed from the terminal.

3. A security system for a transaction terminal according to claim 1, further comprising, in combination:

an IC card (10) having an IC card processor means for controlling operations on said IC card;

IC card input means (16), in communication with said processor means, for reading and writing data to said IC card (10); and wherein said memory means (13) is contained on said IC card, whereby the authorization data stored in said memory means is provided in the IC card, and said IC card processor means sends a coincidence signal to said processor means (11) if it determines that the data received through said data inputting means (16) of said terminal (1) and the authorization data stored in said memory means coincide with each other thereby causing said processor means (11) to interrupt said detection signal.

4. A security system for a transaction terminal according to claim 1, further comprising a recording medium for externally storing said authorization data, whereby said authorization data is transferred to said memory means (11) provided within said terminal through said data inputting means (14).

* * * * *